United States Patent
Tuttle et al.

(10) Patent No.: US 8,876,517 B2
(45) Date of Patent: Nov. 4, 2014

(54) FILTRATION APPARATUS WITH A SEALING DEVICE

(71) Applicant: Nordson Corporation, Westlake, OH (US)

(72) Inventors: Kevin S. Tuttle, Hudson, NC (US); Gregory G. Gambill, Taylorsville, NC (US); Patrick K. Strong, Connelly Springs, NC (US)

(73) Assignee: Nordson Corporation, Westlake, OH (US)

( * ) Notice: Subject to any disclaimer, the term of this patent is extended or adjusted under 35 U.S.C. 154(b) by 28 days.

(21) Appl. No.: 13/788,523

(22) Filed: Mar. 7, 2013

(65) Prior Publication Data

US 2014/0093603 A1    Apr. 3, 2014

Related U.S. Application Data

(60) Provisional application No. 61/707,094, filed on Sep. 28, 2012.

(51) Int. Cl.
*B29C 47/68* (2006.01)
*B01D 25/00* (2006.01)
*B29C 47/08* (2006.01)
*B29C 47/38* (2006.01)

(52) U.S. Cl.
CPC ............ *B01D 25/002* (2013.01); *B29C 47/681* (2013.01); *B29C 47/682* (2013.01); *B29C 47/68* (2013.01); *B29C 47/081* (2013.01); *B29C 47/38* (2013.01); *Y10S 425/047* (2013.01)
USPC ..... 425/197; 425/198; 425/199; 425/DIG. 47

(58) Field of Classification Search
CPC ............................ B29C 47/681; B29C 47/682
USPC ......... 425/197, 199, 198, DIG. 47, DIG. 127; 277/578
See application file for complete search history.

(56) References Cited

U.S. PATENT DOCUMENTS 2,761,748 A    9/1956    Marien
3,962,092 A    6/1976    Newman, Jr.
(Continued)

FOREIGN PATENT DOCUMENTS

FR    331691    5/1903
FR    1394535    2/1965
(Continued)

OTHER PUBLICATIONS

"Beringer Self-Lock • Screen Changer", brochure from Beringer Co. (Jan. 1989).

(Continued)

*Primary Examiner* — Joseph S Del Sole
*Assistant Examiner* — Lawrence D Hohenbrink, Jr.
(74) *Attorney, Agent, or Firm* — Roth Blair Roberts Strasfeld & Lodge

(57) ABSTRACT

A polymer filtration apparatus for sealing a slide plate translatable across a bore of an extrusion or mold machine, includes an annular seal having a sealing surface which is biased against the slide plate by a spring mechanism. The annular seal has a thrust surface which is angled relative to the sealing surface and the thrust surface is located at an opposite axial end of the annular seal from the sealing surface. The spring mechanism can be a single spring with overlapping tangs or a multiple spring assembly in overlapping relationship, with or without tangs, to form a continuous barrier. The spring assembly is used to exert a radial force against the thrust surface of the annular seal to bias the seal in an axial direction against the downstream slide plate. In operation, pressurized polymer melt in the extrusion bore further biases the spring against the annular seal which is then transferred to the seal and the slide plate.

19 Claims, 5 Drawing Sheets

(56) References Cited

U.S. PATENT DOCUMENTS

| | | | |
|---|---|---|---|
| 4,059,525 A | 11/1977 | Krasnow | |
| 4,359,387 A | 11/1982 | Trott | |
| 4,470,607 A | 9/1984 | Schier et al. | |
| 5,380,018 A | 1/1995 | Mader et al. | |
| 5,507,498 A * | 4/1996 | Trott | 277/300 |
| 7,147,774 B2 | 12/2006 | Jones, III | |
| 2002/0050716 A1 | 5/2002 | Cresswell | |
| 2010/0044972 A1 | 2/2010 | Vila | |
| 2011/0084455 A1 * | 4/2011 | Elwell et al. | 277/312 |

FOREIGN PATENT DOCUMENTS

| | | |
|---|---|---|
| FR | 1490131 | 7/1967 |
| FR | 2356445 | 1/1978 |
| WO | 86/07279 | 12/1986 |
| WO | WO 2011/046944 | 4/2011 |

OTHER PUBLICATIONS

"Berlyn Slide Plate Screen Changers—Understanding Screen Changers, a Buyer's Manual," The Berlyn Corp. (1976).

* cited by examiner

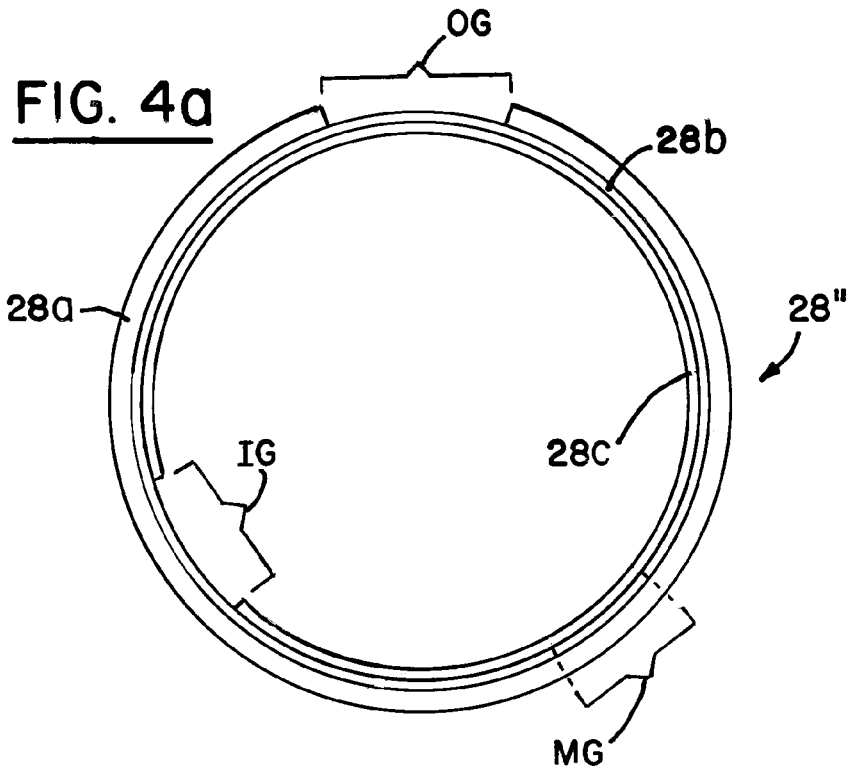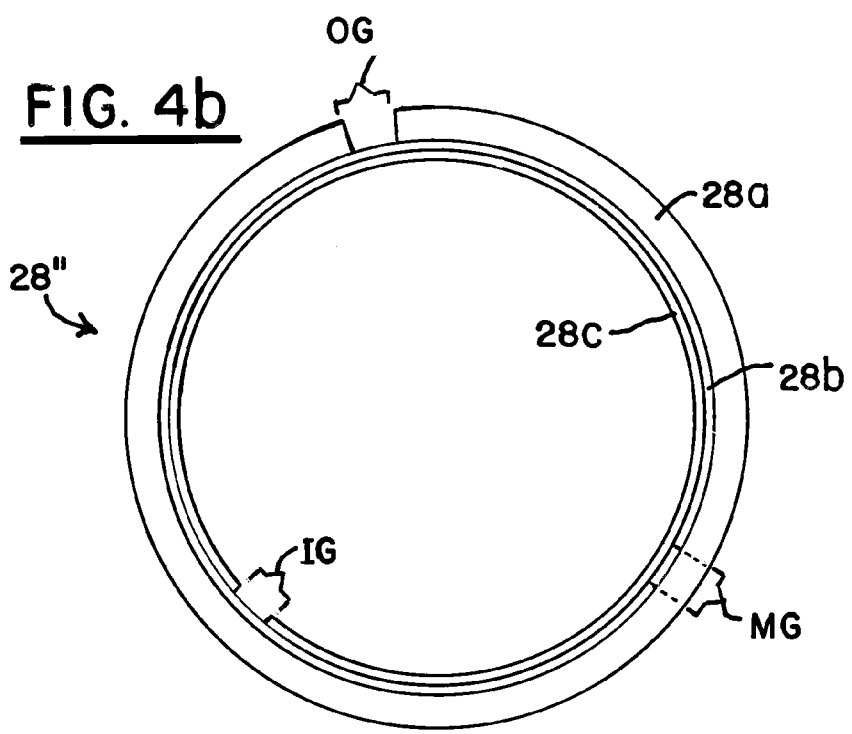

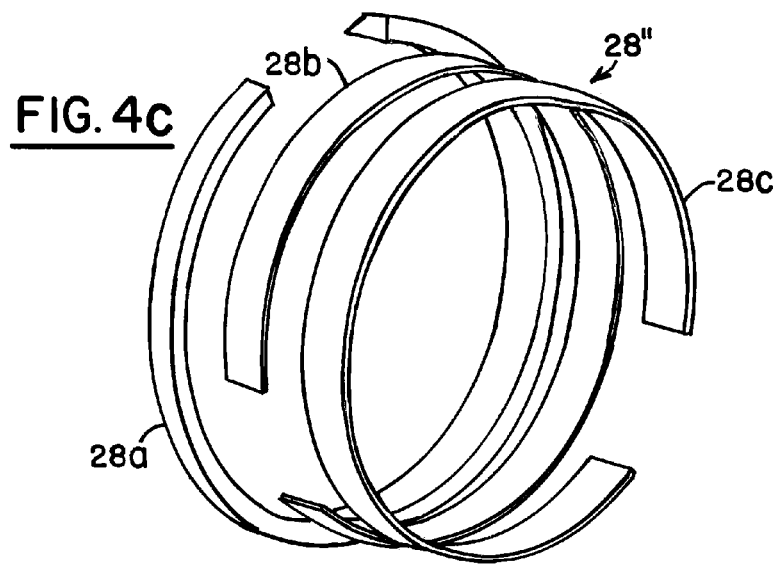
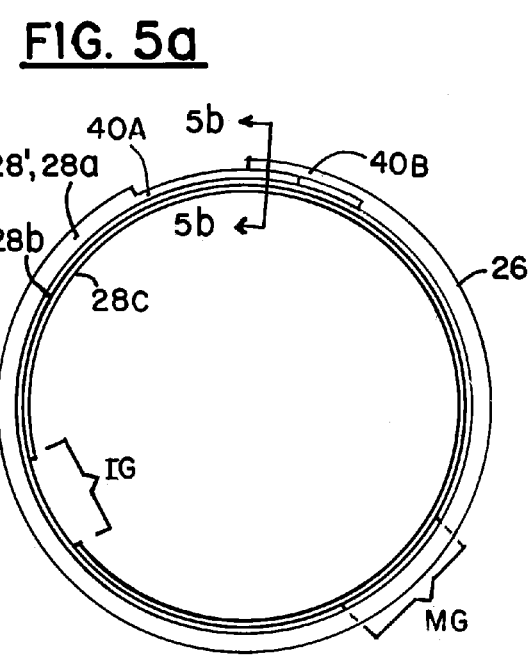
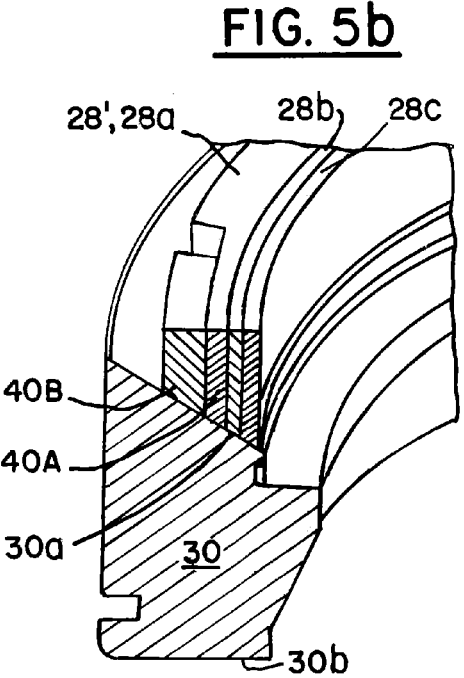

FILTRATION APPARATUS WITH A SEALING DEVICE

This patent application claims priority under 35 U.S.C. §119 to U.S. Provisional Patent Application Ser. No. 61/707,094 filed on Sep. 28, 2012, which is incorporated by reference in its entirety.

FIELD OF THE INVENTION

This invention relates generally to plasticating resin using a screw rotating in an extrusion or injection molding barrel, from which molten polymer resin extrudes or flows to form a product in a die or mold. More particularly, the invention relates to a filtration apparatus placed in-line with the molten flow. The filtration apparatus has a sliding plate and a sealing device having a spring assembly and annular seal to prevent leakage of the molten material being filtered.

BACKGROUND

Filtration apparatus have been used when plasticating a resin polymer material in an extrusion or mold machine having a barrel 18 with an inlet, outlet, and inner surface. More specifically, a rotatable screw 22, located within and closely spaced from the inner surface of the barrel extends from the inlet toward the outlet, and includes a core and a main flight projecting radially from the core in a helix along the axis. The rotation of the screw creates axial and radial forces of molten material as it flows downstream to the outlet.

In a typical application, solid polymer material is fed at the inlet and heated through the barrel 18 while being driven downstream under pressure by the rotating screw. A stream of homogeneously mixed, molten material is preferably produced before passing the outlet to an appropriate downstream module. The downstream module may be a die to shape the molten material into a sheet, tube or other desired extruded profile or a mold for an injection or blow molded part.

Filtration apparatus are often used to assure the quality and uniformity of molten material passing to the downstream module. Typically, the filtration apparatus includes a sliding plate having two filter assemblies A, B that contain screens as filter elements. The filtration apparatus includes an internal bore and a screen changing device 10 to move the sliding plate 16 across the bore through which the polymer material flows. To be clear, the sliding plate 16 is movable across the bore to position one filter assembly in-line, while the other filter assembly is off-line and thus accessible to cleaning or replacement. Accordingly, it is important that the filtration apparatus has a suitable sealing device to prevent the loss of molten polymer material, particularly during operation when there are substantial axial and radial forces of molten material driven by the rotation of the screw. Still further, the sealing device must be effective under relatively high operating temperatures with polymer melts having low viscosities, but yet, not interfere with the mobility of the sliding plate interchange between filter assemblies A and B.

Filtration apparatus in the past have used various sealing devices. One of the better filtration apparatus is disclosed in U.S. Pat. No. 5,507,498, issued to Delano B. Trott and titled "Sealing Device For Polymer Filtration Apparatus" (hereinafter referred to as "Trott"), the description of which is incorporated by reference. In Trott, the filtration apparatus includes a sealing device having an annular seal and a C-shaped spring. The use of the C-shaped spring results in a problem. The C-shaped spring has a gap between its ends and some molten material flowing through the filtration apparatus migrated through this gap to the outer diameter of the seal interacting with the spring. Ultimately, the seal degrades and subsequently fails. Therefore, there is a need for a low maintenance, low wear sealing device which can seal the slide plate at low and high polymer pressures and temperatures, particularly for molten materials having low viscosities. The present invention is a filtration apparatus with such a sealing device and, accordingly, solves the above-described problem.

SUMMARY OF THE INVENTION

According to one embodiment of this invention, a filtration apparatus comprises a slide plate and a sealing device. The sealing device includes an annular seal and a primary spring. The slide plate is translatable across an extrusion or molding machine bore. The annular seal has a sealing surface that abuts against the slide plate. The seal also has a sloped, thrust surface located at an opposite axial end of the seal. The spring is angled relative to and contacts the thrust surface of the annular seal for biasing the sealing surface of the seal against the slide plate. The spring further includes tangs at opposite ends which are always in overlapping contact. Since there is no gap between the opposite ends of the spring, as pressure of the polymer melt in the bore increases, radial forces are exerted on the spring which transfers against the thrust surface of the seal causing the annular seal to be biased against the slide plate and the polymer melt cannot contact the seal.

Accordingly, in another embodiment, the sealing device includes a spring assembly with multiple springs, including at least first and second springs with one or more springs contacting the thrust surface of the seal to bias the sealing surface of the seal against the slide plate. In this embodiment, the second spring is positioned in the inside diameter of the first spring in overlapping contact so that there is no gap for the polymer melt to migrate through even though the opposite ends of the outer or first spring do not overlap. For additional barrier support, one or more of the springs may include overlapping tangs as described above. With each of these different embodiments, as the pressure of the polymer melt in the bore increases, radial forces push against the contacting first or second spring which presses against the thrust surface of the seal, thereby causing the seal to be further biased against the slide plate.

Each embodiment and combination (i.e., spring with overlapping contact tangs and/or multiple springs in overlapping contact relationship) effectively creates a spring that is a continuous barrier (i.e., without any substantial gap), thus sealing any pathway into which the melted polymer may flow.

DESCRIPTION OF THE DRAWINGS

The drawings included herewith are for the purpose of illustration only and not as a definition of the limits of the instant invention, for which reference should be made to the claims appended hereto. Other features, objects and advantages of this invention will become clear from the following more detailed description made with reference to the drawings in which:

FIGS. 4a and 4b show the multiple spring assembly of FIG. 3 in expanded and compressed states, along with an exploded view of the assembly at FIG. 4c;

FIG. 5a shows an alternative of the multiple spring assembly wherein the at least one spring includes overlapping tangs; and FIG. 5b is a sectional view taken along lines 5b-5b in FIG. 5a.

DESCRIPTION OF THE PREFERRED EMBODIMENT

Figure 1:
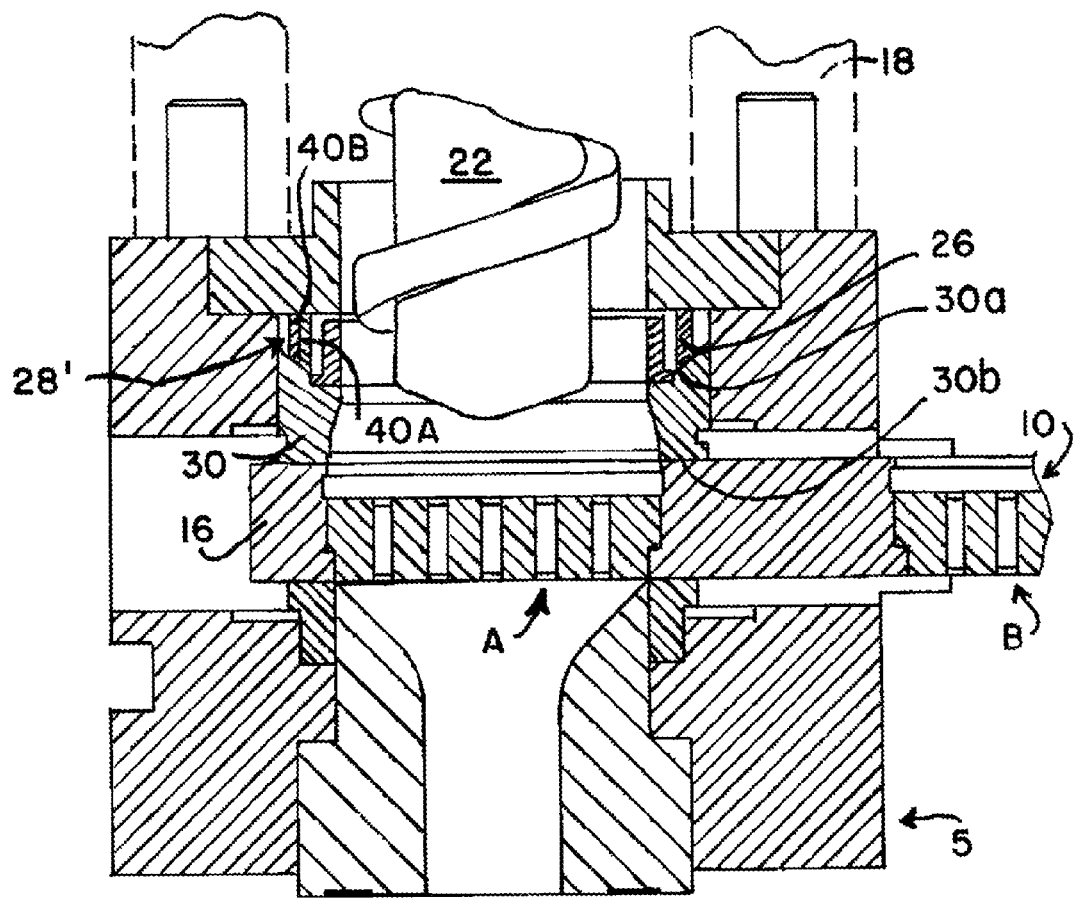
FIG. 1 is a sectional view of the filtration apparatus having a sealing device with a one-piece spring having overlapping tangs.

This description begins with reference to the Trott patent and an explanation of the problem inherent therewith. With reference to FIG. 3 in Trott, the sealing device of the filtration apparatus 10 shown therein includes an annular seal 30 having a sealing surface 30b that abuts against slide plate 16. The seal 30 has a thrust surface 30a located at an opposite axial end of the seal from the sealing surface 30b. A spring 28 biases the sealing surface 30b against the slide plate 16. As pressure in the bore increases, the seal 30 is biased against the slide plate 16. The seal in the Trott invention has been found to require substantial maintenance to address frequent failures, particularly when used with low viscosity molten materials at high temperatures and pressures in combination with short machine cycle times. It was found by Applicants that the failures in the Trott design were being caused on account of its spring 28. More specifically, Trott uses a one-piece, C-shaped spring. Specifically, the C-shape spring 28 has a gap to allow expansion and contraction of the spring 28. To be clear, the expansion and contraction of spring 28 is used to transfer the radial forces of the molten material against the thrust surface 30a of the seal 30. However, the gap provides a pathway into which polymer melt can flow, thereby causing wear, degradation and ultimately leakage at the seal, such as "hang up" and stagnation, thereby reducing the quality and uniformity of polymer material being processed. The instant invention solves this and other problems inherent in Trott.

Figure 2A:
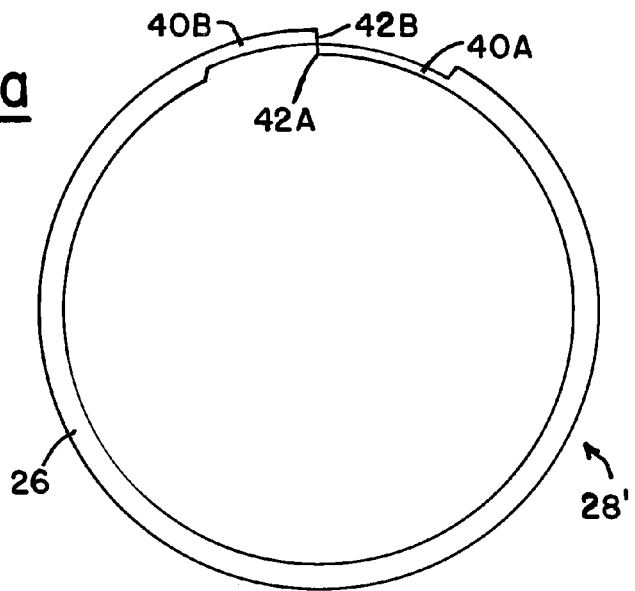
FIGS. 2a and 2b show the spring of FIG. 1 in expanded and compressed states.
Figure 2B:
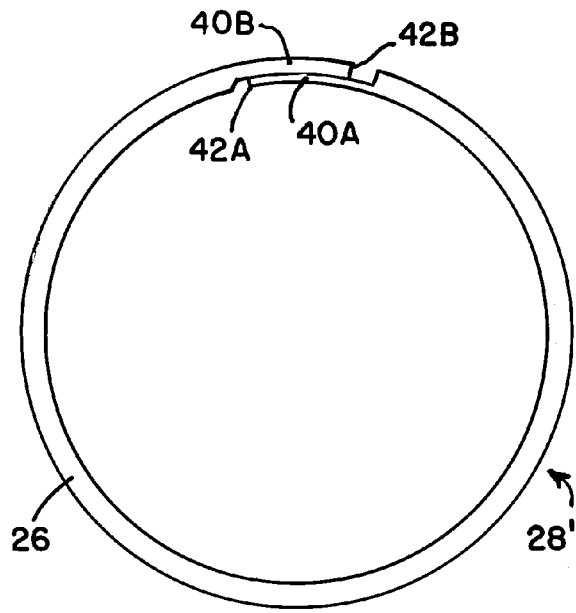

With this invention, the first preferred embodiment replaces spring 28 in Trott with single-spring 28' shown in FIGS. 1, 2a and 2b. Unlike spring 28 in Trott, spring 28' in this case includes opposing tangs 40A, 40B, with respective end portions 42A, 42B. Tang 40A extends beneath the outside tang 40B in the assembled, strained state of spring 28' as best seen in FIG. 2b. To be clear, the state of spring 28' shown in FIG. 2a is its natural, unstrained state. When spring 28' is assembled in the filtration apparatus 5 as shown in FIG. 1, spring 28' must be compressed (as shown in FIG. 2b). Spring 28' is held in place in the compressed state pressing against the annular seal 30.

The dimensions of spring 28' can be varied, including the hardness and thickness of its core 26 (i.e., "core" meaning the spring portion between tangs), to achieve the force needed for proper compression and expansion, which in turn effects the force transposed to the thrust surface 30a of the annular seal 30 to create the optimum seal between the slide plate 16 and sealing surface 30b. The thickness of at least one tang (40A or 40B) is preferably less than half the thickness of the core 26 of spring 28', but more importantly tangs 40A, 40B must be firm enough to prevent deformation from the spring's circumference. The inside tang 40A in this embodiment is shown thinner than the outside tang 40B, although it may be reversed. Still further, the inside tang 40A is preferably, slightly less stiff than the outside tang 40B, so that tang 40A can push against the underside of tang 40B by the radial force of the polymer melt in the extrusion machine. Thus, on account of tangs 40A, 40B of the spring 28', the gap in Trott is eliminated, thereby creating a continuous barrier to prevent polymer melt from migrating into contact with the seal.

As seen in FIGS. 2a and 2b, as radial forces change within the machine, the two tangs 40A, 40B continue to stay in contact while spring 28' compresses and expands. As a result, this embodiment effectively creates a continuous spring closure, thus eliminating any pathway into which melted polymer may otherwise flow.

A second embodiment of the filtration apparatus with an sealing device different then Trott, includes a multiple spring assembly 28". With reference to FIGS. 4a-4c, spring assembly 28" is composed of three individual springs 28a, 28b and 28c, each having a gap OG, MG and IG, respectively, and the gaps being offset to eliminate any pathway. However, it should be noted that this multiple spring embodiment of the invention should not be limited to three springs, but may include two or more springs. Further, the outermost or primary spring 28a of the multiple spring assembly 28" can be identical to spring 28' in the first embodiment. Like spring 28', the outermost, primary spring 28a is used to provide the main structure and force needed to compress the seal 30 against the slide plate 16. Again, it is important to note, that in this alternative second embodiment shown in FIGS. 4a-4c, primary spring 28a does not have opposing tangs 40A, 40B. Tangs 40A, 40B are optional. Instead, primary spring 28a in this case is shown having a gap OG, like the C-shape spring 28 of Trott.

This second multi-spring embodiment is unique on account of the additional springs (in this illustration, middle and innermost springs, 28b, 28c, respectively). More specifically, the middle spring 28b is in overlapping contact relationship with the inside diameter of the outermost, primary spring 28a, and the innermost spring 28c is in overlapping contact relationship with the inside diameter of the middle spring 28b. Importantly, the innermost and middle springs 28c, 28b, respectively, are thinner in comparison to the primary spring 28a. Further, the stiffness of springs 28c, 28b are also relatively lower than the primary spring 28a, so that they move in unison to conform to the changing diameter of primary spring 28a. As previously stated, both the innermost and middle springs 28c, 28b have gaps IG, MG, respectively, to allow them to expand and contract with the radial forces of molten material in the filtration apparatus.

To be clear, as shown in FIGS. 4a and 4b, springs 28a, 28b, 28c are nested together and oriented so that each gap is offset, relative to the others, thereby forming a closed barrier. FIG. 4c shows an exploded view of the otherwise nested multiple spring assembly 28" to better illustrate the offset orientation of the gaps OG, MG and IG of springs 28a, 28b and 28c, respectively.

Figure 3A:
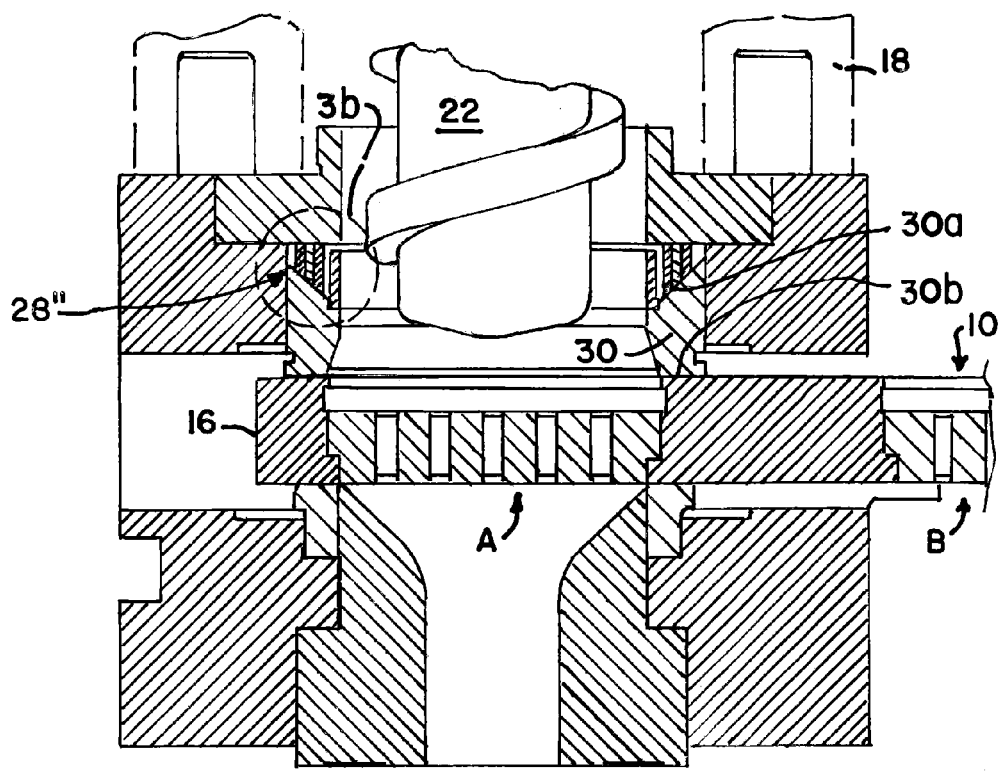
FIG. 3a is a sectional view of a second embodiment of the filtration apparatus and FIG. 3b is an isolated enlarged view of the sealing device having a multiple spring assembly.
Figure 3B:
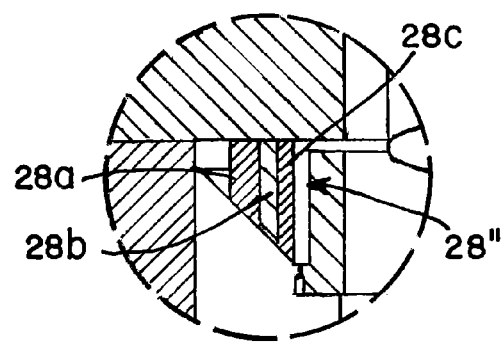

In assembly, the innermost and middle springs 28c, 28b are compressed, so that they expand against the outermost primary spring 28a. As a result, springs 28c, 28b are held in place within the filtration apparatus (as shown in FIGS. 3a and 3b) by their own expanding forces. By offsetting the gaps OG, MG and IG in springs 28a, 28b and 28c, a tight, superior barrier and closure is formed and any pathway where polymer melt would otherwise flow, has been sealed off.

Finally, regarding the second (i.e., multi-spring) embodiment described above, a further alternative is shown in FIGS. 5a and 5b (wherein the outermost, primary spring 28a has the same structure as spring 28', i.e., including tangs 40A, 40B), springs 28c, 28b and 28a should be in the same offset oriented relationship as described above. Moreover, to form the most effective barrier, the gaps MG, IG of springs 28b and 28c should offset each other and the gap MG of middle spring 28b should be offset from tangs 40A, 40B of spring 28*a* (i.e., primary spring 28' in this case).

It will thus be seen that variations of a new and useful filtration apparatus with a sealing device have been illustrated and described. With this description, it would be apparent to those skilled in the art that various combinations, changes or modifications may be made to the invention without departing from its spirit. For example, other variations of the multiple spring assembly 28" could include two or more nested springs, in combination with or without tangs and offset gaps, to form an appropriate barrier closure that would have the capacity to create the needed pressure against the thrust surface 30*a* of the annular seal 30 to firmly bias the seal surface 30*b* against the slide plate 16.

In accordance with the provisions of the patent statutes, therefore, this invention has been explained and illustrated in the various preferred embodiments. It must be understood, however, that this invention may be practiced otherwise than as specifically illustrated without departing from the scope of the claims that follow.

What is claimed is:

1. A filtration apparatus for an extrusion or injection molding machine having a bore for passage of a polymer melt, said filtration apparatus including a slide plate and a sealing device for sealing said slide plate, said sealing device comprising:
   an annular seal having a sealing surface which abuts against said slide plate, said slide plate being translatable across the bore of the extrusion or injection molding machine, said annular seal having a thrust surface located at an opposite axial end of said seal from said sealing surface, said thrust surface being angled relative to said sealing surface; and
   a first spring having a length oriented parallel to an axis of the extrusion or injection molding machine and an angled push surface contacting flush to said thrust surface of said annular seal, said push surface being a complete closed ring for biasing said sealing surface of said annular seal against said slide plate, and wherein said first spring having first and second tangs at opposing ends, each of said first and second tangs having a cross-section with an outside surface and an underside surface with its corresponding push surface therebetween, said first and second tangs are always positioned in overlapping relationship so that an outside surface of said first tang contacts said underside surface of said second tang to form a first radial closure against passage of polymer melt upon expansion and contraction of said first spring caused by a change in pressure of polymer melt in the bore, and wherein increasing radial pressure of polymer melt in the bore forces said first spring to expand so that said first spring uniformly transfers the pressure axially through said closed ring of said push surface against said thrust surface of said annular seal causing said sealing surface of said annular seal to be further biased against said slide plate forming a secure annular axial closure.

2. The filtration apparatus of claim 1, wherein said sealing device further comprising a second spring having a gap, said second spring being positioned within an inside diameter of said first spring in overlapping contact relationship thereby forming a second radial closure with said first spring.

3. The filtration apparatus of claim 1, wherein said sealing device further comprising a second spring having first and second tangs at opposing ends in overlapping contact relationship to form a second radial closure of said second spring, and said second spring being positioned within an inside diameter of said first spring in overlapping contact relationship thereby forming a third radial closure with said first spring.

4. The filtration apparatus of claim 2, wherein said sealing device also includes a third spring having a gap, said third spring being positioned in overlapping contact relationship with an inside diameter of said second spring, and the gap of said second spring is oriented so as not to overlap the gap of said third spring thereby forming a third radial closure with the second spring.

5. The filtration apparatus of claim 2, wherein said sealing device still further comprising a third spring with first and second tangs at opposing ends in overlapping contact relationship to form a third radial closure of said third spring.

6. The filtration apparatus of claim 3, wherein said sealing device also includes a third spring having a gap, said third spring being positioned in overlapping contact relationship with an inside diameter of said second spring, and said gap of the second spring is oriented so as not to overlap said gap of the third spring.

7. The filtration apparatus of claim 3, wherein said sealing device still further comprising a third spring with first and second tangs at opposing ends in overlapping contact relationship to form a third radial closure of said third spring.

8. A filtration apparatus for an extrusion or injection molding machine having a bore for passage of a polymer melt, said filtration apparatus including a slide plate and a sealing device for sealing said slide plate, said sealing device comprising:
   an annular seal having a sealing surface which abuts against said slide plate, the slide plate being translatable across the bore of the extrusion or molding machine, said annular seal having a thrust surface located at an opposite axial end of said seal from the sealing surface, said thrust surface being angled in relation to said sealing surface; and
   a spring assembly including first and second springs with each spring having a length oriented parallel to an axis of the extrusion or injection molding machine, each spring further having a gap, an outside surface, an underside surface, and a push surface between said outside and underside surfaces, and said second spring being positioned within an inside diameter of said first spring in overlapping relationship wherein said gap of said second spring is oriented so as not to overlap said gap of said first spring thereby forming a first radial closure between said first and second springs to seal against passage of polymer melt upon expansion and contraction of said springs caused by a change in pressure of polymer melt in the bore, and further wherein said push surfaces of said first and second springs form a closed ring contacting flush to said thrust surface of said annular seal, so that increasing pressure of polymer melt in the bore forces said closed ring of said push surfaces of the first and second contacting springs to move against said thrust surface of said annular seal causing said annular seal to be uniformly biased against said slide plate to secure the axial closure.

9. The filtration apparatus of claim 8, wherein said spring assembly of said sealing device further includes a third spring having a gap, said third spring being positioned in an inside diameter of said second spring in an overlapping contact relationship, and said gap of said third spring being oriented to avoid overlap with said gap of said second spring thereby forming a second radial closure between said second and third springs.

10. The filtration apparatus of claim 8, wherein said second springs includes tangs at opposite ends of its corresponding gap and said tangs being in overlapping contact relationship to form a barrier across said gap of said second spring.

11. The filtration apparatus of claim 10, wherein said sealing device further comprising a third spring with first and second tangs at opposing ends in overlapping contact relationship to form a second radial closure of said third spring.

12. The filtration apparatus of claim 10, wherein said sealing device also includes a third spring having a gap, said third spring being positioned in overlapping contact relationship with an inside diameter of said second spring and said gap of the third spring being oriented so as not to overlap said tangs of the second spring to form a second radial closure.

13. The filtration apparatus of claim 8, wherein said sealing device further comprising a third spring having a gap and first and second tangs at opposing ends in overlapping contact relationship to form a barrier across said gap of said third spring, said third spring being positioned in an inside diameter of said second spring in an overlapping contact relationship therewith, and said gap of said second spring being oriented to avoid overlap with said tangs of said third spring to form a second radial closure.

14. A filtration apparatus for an extrusion machine or injection molding machine having a bore for passing molten resin, said filtration apparatus including a slide plate and a sealing device for sealing the slide plate, said sealing device comprising:
   an annular seal having a sealing surface which abuts against said slide plate, said slide plate being translatable across the bore of the extrusion or injection molding machine, said annular seal having a thrust surface located at an opposite axial end of said seal from said sealing surface, said thrust surface being angled in relation to said sealing surface; and
   a spring means having a length oriented parallel to an axis of the extrusion or molding machine establishing a barrier to form a dynamic radial closure to prevent radial passage of molten resin upon expansion and contraction of said spring means caused by a change in pressure of molten resin in the bore, and wherein said spring means includes a push surface contacting said thrust surface in a closed ring that is pressed against said thrust surface, being operable so that increasing pressure of polymer melt in the bore is transferred by said push surface of said spring means against said thrust surface of said annular seal causing said annular seal to be further biased along the axis of the extrusion or molding machine and against said slide plate for a secure axial closure between said sealing surface of said annular seal and said slide plate.

15. The filtration apparatus of claim 14, wherein said spring means further comprises a first spring with a first gap and second spring having a second gap, the second spring being positioned in contact relationship with an inside diameter of the first spring and said second gap being oriented to avoid overlap with said first gap of said first spring to form said dynamic radial closure.

16. The filtration apparatus of claim 14, wherein said spring means further comprises a first spring with tangs at opposite ends in overlapping contact relationship so as to form said dynamic radial closure.

17. The filtration apparatus of claim 15, wherein said spring means further comprises a third spring having a gap, the third spring being positioned in contact relationship with an inside diameter of said second spring, and further wherein said gap of said second spring is oriented so as not to overlap the said gap of said third spring.

18. The filtration apparatus of claim 16, wherein said spring means further comprises a second spring having a gap, said second spring being positioned in contact relationship with an inside diameter of said first spring, and said gap being oriented to avoid overlap with said tangs of said first spring.

19. The filtration apparatus of claim 1, wherein the first tang having a radial thickness different than a radial thickness of the second tang.

\* \* \* \* \*